United States Patent

[11] 3,539,147

| [72] | Inventor | Herman L. Paul, Jr.<br>450 Westover Road, Stamford, Connecticut 06902 |
|---|---|---|
| [21] | Appl. No. | 792,260 |
| [22] | Filed | Jan. 21, 1969 |
| [45] | Patented | Nov. 10, 1970 |

[54] POWER ACTUATED BALL VALVE
6 Claims, 6 Drawing Figs.

[52] U.S. Cl. ................................................. 251/58, 251/304; 74/89
[51] Int. Cl. ........................................................ F16k 31/528 F16k 5/06
[50] Field of Search ........................................... 251/58, 305, 309, 304

[56] References Cited
UNITED STATES PATENTS

| 3,007,669 | 11/1961 | Fredd | 251/58X |
| 3,276,471 | 10/1966 | Hagner | 251/305X |

*Primary Examiner*—Arnold Rosenthal
*Attorney*—F. J. Pisarra

ABSTRACT: This invention is directed to a power actuated ball valve in which a sleeve piston surrounds the valve ball and carries a pair of diametrically opposed disc rotors that are operably and eccentrically connected to the valve ball so that when the piston is moved, the rotors are bodily moved therewith and forced to rotate in one direction while simultaneously causing the valve ball to rotate in the opposite direction.

INVENTOR
HERMAN L. PAUL, JR.

BY F. J. Pisarra

ATTORNEY

INVENTOR
HERMAN L. PAUL, JR.

BY F. J. Pisarra

ATTORNEY

POWER ACTUATED BALL VALVE

RELATED APPLICATIONS

Copending application by the same inventor, Ser. No. 588,509, filed Oct. 21, 1966, now U.S. Pat. No. 3,417,628, for "Motion Converting Mechanisms" discloses and claims the type of mechanism per se that is employed in this invention to convert reciprocal motion to rotary motion and in the invention disclosed and claimed in copending application by the same inventor, Ser. No. 784,735, filed Dec. 18, 1968, for "Power Actuator for Rotary Valves".

THE INVENTION

This invention relates generally to new and useful improvements in mechanisms for converting rectilinear motion to rotary motion and particularly seeks to provide a novel ball valve that is power actuated by such a mechanism.

Quarter turn ball valves in general are known to be old as are certain type power actuators for same. However, prior known types of ball valves and actuators have been quite bulky and have been unsuitable for installation in remote or inaccessible locations such as those required for modern naval submarines and deep submergence research vessels.

Power actuated ball valves constructed in accordance with this invention meet these requirements.

Therefore, an object of this invention is to provide a compact power actuated ball valve capable of operating under the pressures of deep submergence.

Another object of this invention is to provide a ball valve of the character stated in which all operative parts are completely enclosed.

Another object of this invention is to provide a ball valve of the character stated in which the reciprocating motion of a fluid operated actuating piston is converted to the oscillating motion of the valve ball.

Another object of this invention is to provide a ball valve of the character stated in which the piston is operably connected to the valve ball through a pair of rotors that are parallaxial with the valve ball and eccentrically located rotor pins that extend through the rotors and into adjacent portions of the valve ball.

A further object of this invention is to provide a ball valve of the character stated that is simple in design, rugged in construction and economical to manufacture.

With these and other objects, the nature of which will be apparent, the invention will be more fully understood by reference to the drawings, the accompanying detailed description and the appended claims.

Figure 1:
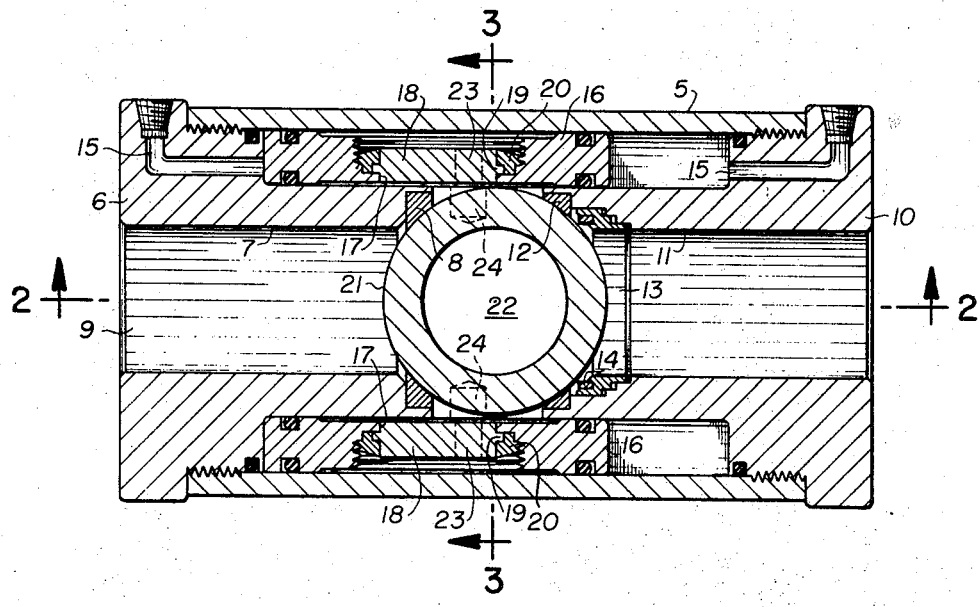
FIG. 1 is a horizontal midsection of a power actuated ball valve constructed in accordance with this invention.
Figure 4:
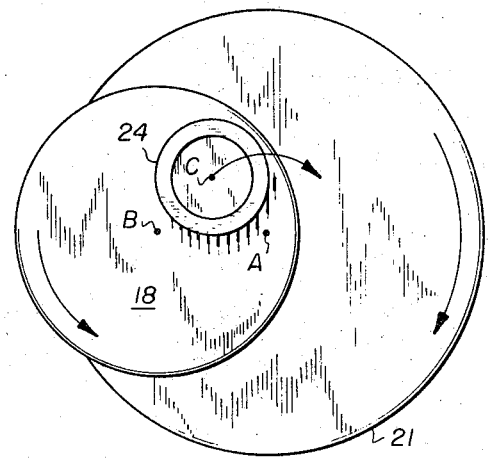
Figure 5:
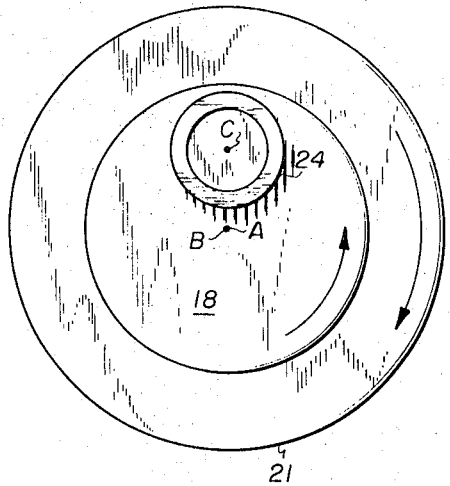
Figure 3:
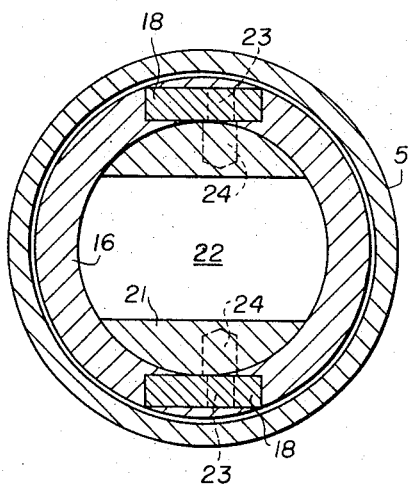
FIG. 3 is a vertical transverse section taken along line 3–3 of FIG. 1.
Figure 6:
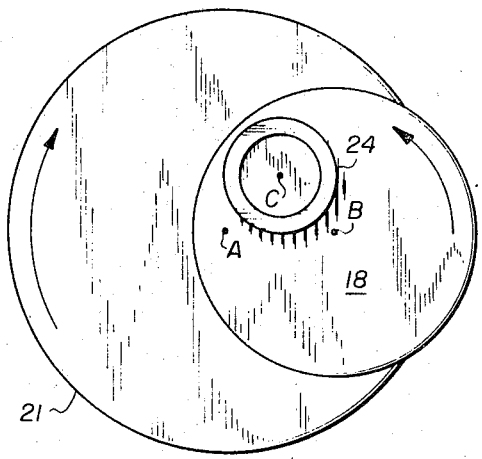

FIGS. 4—6 are diagrammatic detail side elevation views of the relative positions of the rotors, connecting pins and valve ball during one full stroke of the piston in a left to right direction as viewed in FIG. 1; for the purpose of simplicity in illustration the valve ball is shown as a disc.

Referring to the drawings in detail, the invention, as illustrated, is embodied in a power actuated ball valve designed for use with the sea water piping of deep submergence vessels and includes a cylindrical body sleeve 5 having one end closed by a plain retainer plug 6 having a tubular inner extension 7 of reduced diameter into the end of which is fitted an annular valve ball retainer 8. The retainer plug 6 is also provided with an axial bore 9 extending therethrough and having a diameter corresponding to that of the pipe to which the valve is to be connected.

The other end of the sleeve 5 is closed by a sealing retainer plug 10 having a tubular inner extension 11 of reduced diameter into the end of which is fitted an annular valve ball retainer 12 that is symmetrically opposed to the annular retainer 8. The inner end of the tubular extension 11 is also provided with an axial bore 11a and a longitudinally stepped cylindrical seal retainer 13 into which is fitted an annular seal 14.

Each of the sleeve end retainer plugs 6 and 10 is provided with a duct 15 that extends from the outside thereof into communication with the interior of the sleeve 5 for connection with a source of high pressure (on the order of 3,000 p.s.i.g.) hydraulic fluid to operate a sleeve piston as will be hereinafter more fully described.

A sleeve piston 16 is slidably mounted within the body sleeve 5 and over the opposed ends 7 and 11 of the end retainer plugs 6 and 10 and is provided with a pair of diametrically opposed circular apertures 17, 17, into each of which is fitted an oscillatable disc rotor 18 having a retaining flange 19. A retainer annulus 20 holds each rotor in its operative position in the wall of the sleeve piston 16.

A valve ball 21, provided with an axial duct 22 having the same diameter as the axial bores 9 and 11a, is fitted within the retainers 8 and 12 and against the annular seal 14.

Each of the rotors 18 carries a fixed rotor pin 23 that is eccentrically mounted with respect to the axis of rotation of the rotor and is provided with a stud 24 that extends into a corresponding socket or recess formed in the adjacent portion of the valve ball 21 and eccentric with respect to the axis of rotation thereof.

Figure 2:
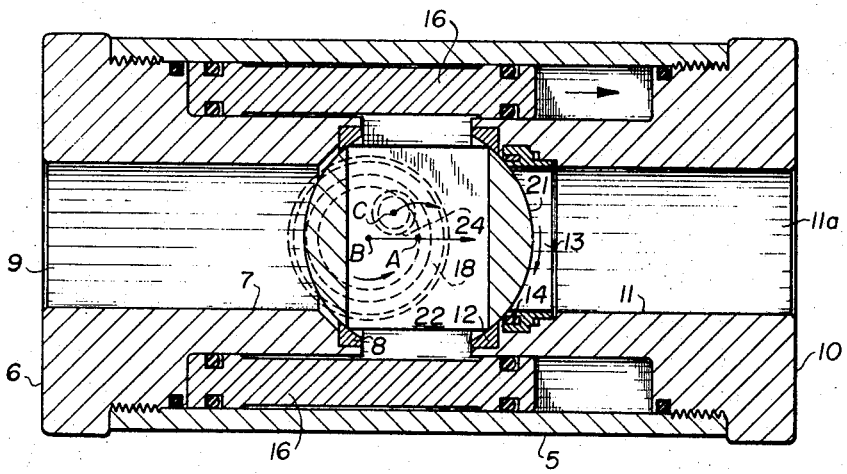
FIG. 2 is a vertical midsection thereof taken along line 2–2 of FIG. 1.

Before describing the operation of this valve, it will be assumed that the necessary piping and control valves for high pressure fluid have been connected to the ducts 15 in the end retainer plugs and that the parts are in the relative positions shown in FIGS. 1 and 2 as at the start of a quarter turn (90°) valve ball opening step with the sleeve piston 16 at the left end limit of its reciprocation.

Now, as high pressure fluid is admitted to the left end of the sleeve piston 16, the piston will be urged to the right. Since the valve ball 21 rotates about a fixed transverse axis, and the axis of the rotors 18 moves along a horizontal plane as the piston advances, the rotors 18, due to the interconnections between them, the rotor pins studs 24 and the valve ball 21, are caused to rotate in a counterclockwise direction and in turn cause the valve ball to rotate in a clockwise direction. The full stroke of the piston from left to right thus causes the required 90° rotation of the valve ball 21 in a clockwise direction to open the valve.

A more complete understanding of the relative motions involved may be gained from a study of FIGS. 4—6 which illustrate the relative positions of the rotors 18, the rotor pin studs 24 and the valve ball 21 at the beginning, middle and end of the above-described operation. In these figures the centers of the valve ball 21 are shown in vertical alignment since it is only that element that has a fixed axis of rotation.

FIG. 4 shows the parts in the same relative positions as in FIGS. 1 and 2 and it will be seen that the axis of rotation of the valve ball 21 is at A, the axis of rotation of the rotors 18 is horizontally to the left at B and the initial axis of the rotor pin studs 24 is 45° to the upper left of the axis A at C.

FIG. 5 represents the relative positions of the parts at midstroke of the sleeve piston 16 from left to right, and it will be seen that the axis A has remained fixed while the axis B has moved linearly and horizontally to the right along with the movement of the piston and coincides with the axis A. This has forced the rotors 18 to rotate in a counterclockwise direction and caused the rotor pin studs 24 to move bodily through an arc of 45° in a clockwise direction, thus effecting a corresponding clockwise movement of the valve ball 21.

These same relative movements continue until the end of the stroke of the sleeve piston 16, at which time the axis A is still fixed, the axis of the rotors 18 is horizontally to the right at B and the axis of the rotor pin studs 24 is 45° to the upper right of the axis A.

On the return stroke of the piston these relative motions are reversed.

The operation of this valve is relatively slow, taking upwards of five seconds to complete one stroke of the sleeve piston, so that there is little or no shock loading imposed on any of the parts and there is no need for any cushioning or damping devices.

Although the power actuated ball valve of this invention has been described as particularly suitable for installation in the sea water piping of deep submergence vessels where such valves are frequently located on the outside of the vessels and consequently are subjected to the same external pressures as the vessels themselves, it will be appreciated that these valves are equally adaptable for any other type of installation that requires the power actuation of remotely located or normally inaccessable valves.

The principles of this invention are equally applicable to plug valves.

It is of course to be understood that variations in arrangements and proportions of parts may be made within the scope of the appended claims.

I claim:

1. A power actuated rotary valve including, a cylindrical body sleeve, a pair of plugs closing the ends of said body sleeve, each of said plugs being provided with an inwardly projecting cylindrical extension having an outside diameter less than the inside diameter of said body sleeve and with an axial bore having a diameter corresponding to that of a pipe to which said valve is to be connected, a rotary valve element journaled between the opposed ends of said cylindrical extensions and provided with a transverse bore having a diameter corresponding to that of said axial bores, a sleeve piston reciprocably mounted over said cylindrical extensions within said body sleeves, an actuating rotor rotatably mounted within the wall of said sleeve piston for rotation about an axis parallel to that of said rotary valve element, and a rotor pin operably connecting said rotor to said rotary valve element, said rotor pin being eccentric both to the axis of rotation of said rotor and said rotary valve element whereby to cause said rotor to move bodily and rotate in one direction as said sleeve piston is moved and simultaneously to cause said rotary valve element to rotate in the opposite direction from that of said rotor.

2. The valve of claim 1 in which said rotary valve element is a ball.

3. The valve of claim 2 additionally including a second rotor and rotor pin mounted in the wall of said sleeve piston at a position diametrically opposite that of said first rotor and rotor pin.

4. The valve of claim 3 in which said rotors are discs.

5. The valve of claim 4 additionally including valve ball retaining annuli at the opposed ends of said cylindrical extensions, and an annular seal carried by one of said cylindrical extensions and engaged with the associated portion of said valve ball.

6. The valve of claim 1 in which said rotary valve element is a plug.